(12) United States Patent
Kim et al.

(10) Patent No.: US 12,421,338 B2
(45) Date of Patent: Sep. 23, 2025

(54) MODIFIED CONJUGATED DIENE-BASED POLYMER, METHOD FOR PREPARING THE SAME AND RUBBER COMPOSITION COMPRISING THE SAME

(71) Applicant: LG CHEM, LTD., Seoul (KR)

(72) Inventors: Hyun Jun Kim, Daejeon (KR); No Ma Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 727 days.

(21) Appl. No.: 17/778,187

(22) PCT Filed: Jul. 14, 2021

(86) PCT No.: PCT/KR2021/009028
§ 371 (c)(1),
(2) Date: May 19, 2022

(87) PCT Pub. No.: WO2022/030794
PCT Pub. Date: Feb. 10, 2022

(65) Prior Publication Data
US 2023/0051287 A1    Feb. 16, 2023

(30) Foreign Application Priority Data

Aug. 5, 2020 (KR) .......... 10-2020-0098086

(51) Int. Cl.
| | | |
|---|---|---|
| *C08F 236/10* | (2006.01) | |
| *C08C 19/22* | (2006.01) | |
| *C08C 19/25* | (2006.01) | |
| *C08K 3/04* | (2006.01) | |
| *C08K 3/36* | (2006.01) | |

(52) U.S. Cl.
CPC ............ *C08F 236/10* (2013.01); *C08C 19/22* (2013.01); *C08C 19/25* (2013.01); *C08K 3/04* (2013.01); *C08K 3/36* (2013.01)

(58) Field of Classification Search
CPC ........ C08K 3/30; C08F 236/10; C08F 226/00; C08F 226/02; C08F 236/06; C08F 212/26; C08F 212/08; C08F 226/06; C08F 228/02; C08F 212/30; C08F 212/14; C08F 8/34; C08F 36/00; C08F 2/001; C08C 19/22; C08C 19/25; C08C 19/20
See application file for complete search history.

(56) References Cited

U.S. PATENT DOCUMENTS

| 4,397,994 A | 8/1983 | Takeuchi et al. |
|---|---|---|
| 2014/0371383 A1 | 12/2014 | Hayata et al. |
| 2018/0016361 A1 | 1/2018 | Urata |
| 2018/0298135 A1 | 10/2018 | Kimura et al. |
| 2018/0371113 A1 | 12/2018 | Lee et al. |
| 2018/0371114 A1 | 12/2018 | Lee et al. |
| 2019/0263956 A1 | 8/2019 | Kim et al. |
| 2020/0223969 A1 | 7/2020 | Lee et al. |
| 2020/0354482 A1 | 11/2020 | Lee et al. |
| 2021/0079124 A1 | 3/2021 | Lee et al. |
| 2022/0010105 A1 | 1/2022 | Oh et al. |

FOREIGN PATENT DOCUMENTS

| CN | 108473620 A | 8/2018 |
|---|---|---|
| CN | 108473621 A | 8/2018 |
| CN | 111201255 A | 5/2020 |
| EP | 1 400 543 A1 | 3/2004 |
| EP | 3 567 062 A1 | 11/2019 |
| JP | S61-285207 A | 12/1986 |
| JP | 2013-155253 A | 8/2013 |
| JP | 2014-084373 A | 5/2014 |
| JP | 2014-136758 A | 7/2014 |
| JP | 2015-120791 A | 7/2015 |
| JP | 6354493 B2 | 7/2018 |
| JP | 2018-119105 A | 8/2018 |
| JP | 2019-516842 A | 6/2019 |
| JP | 2019-172807 A | 10/2019 |
| JP | 2020-050687 A | 4/2020 |
| KR | 10-1600722 B1 | 3/2016 |
| KR | 10-2019-0038287 A | 4/2019 |
| KR | 10-2019-0128580 A | 11/2019 |
| KR | 10-2019-0128583 A | 11/2019 |
| KR | 10-2019-0128599 A | 11/2019 |
| KR | 10-2020-0078405 A | 7/2020 |

(Continued)

OTHER PUBLICATIONS

JPS61285207A Translation (Year: 1986).*
Hogan, et al., "Lithiated Thiaaacetals as Inhibitors for Living Anionic Polymerization of Diene Elastomers: Polymerization and Compunding", 2007, Rubber Chemistry and Technology, vol. 80, Issue 2, p. 194-211.
Office Action issued Oct. 25, 2023 for corresponding Chinese Patent Application No. 202180006682.5 Note: JP 2014-136758 A was cited in a prior IDS.
Office Action issued Nov. 23, 2023 for corresponding Korean Patent Application No. 10-2020-0098086 Note: JP 2015-120791 A was cited in a prior IDS.

(Continued)

*Primary Examiner* — Randy P Gulakowski
*Assistant Examiner* — Virginia L Stonehocker
(74) *Attorney, Agent, or Firm* — Morgan, Lewis & Bockius LLP

(57) ABSTRACT

A modified conjugated diene-based polymer including a repeating unit from a conjugated diene-based monomer; a derived unit from an N-containing aromatic hydrocarbon compound; a derived unit from an S-containing aromatic hydrocarbon compound or an S-containing heterocycle compound, and Si. Each of Si content and N content is 50 ppm or more based on the total weight of the polymer. The modified conjugated diene-based polymer satisfies the following conditions: (i) molecular weight distribution (PDI; MWD): 1.0 or more and less than 3.0; and (ii) a S content is 25 ppm or more based on a total weight of the polymer.

17 Claims, No Drawings

(56) References Cited

FOREIGN PATENT DOCUMENTS

| WO | 2016/125596 A1 | 8/2016 |
| WO | 2017/065301 A1 | 4/2017 |
| WO | 2019/112261 A1 | 6/2019 |

OTHER PUBLICATIONS

Office Action issued in Japanese Office Action application No. 2022-529906 dated Jul. 3, 2023.
International Search Report (with partial translation) and Written Opinion dated Nov. 11, 2021, for corresponding International Patent Application No. PCT/KR2021/009028.
Extended European Search Report issued in corresponding European Patent Application No. 21853988.0 dated Dec. 14, 2022.
Database WPI, Week 201994 Thomson Scientific, London, GB; AN 2019-98531 Q, XP002808152.

* cited by examiner

MODIFIED CONJUGATED DIENE-BASED POLYMER, METHOD FOR PREPARING THE SAME AND RUBBER COMPOSITION COMPRISING THE SAME

CROSS-REFERENCE TO RELATED APPLICATIONS

The present application claims the benefit of priority based on Korean Patent Application No. 10-2020-0098086, filed on Aug. 5, 2020, the entire contents of which are incorporated herein by reference.

TECHNICAL FIELD

The present invention relates to a modified conjugated diene-based polymer which has excellent processability and good tensile strength and viscoelasticity properties, a method for preparing the same and a rubber composition comprising the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan 5 value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyl-lithium which is a monofunctional initiator in a non-polar solvent, using a coupling agent such as a tin compound.

Meanwhile, the polymerization of SBR or BR may be conducted by batch type or continuous type polymerization. According to the batch type polymerization, the polymer thus prepared has narrow molecular weight distribution and merits in view of the improvement of physical properties, but there are problems with low productivity and deteriorated processability. According to the continuous type polymerization, polymerization is continuously carried out and there are merits in view of excellent productivity and the improvement of processability, but there are problems with wide molecular weight distribution and inferior physical properties. Therefore, research on improving productivity, processability and physical properties at the same time during preparing SBR or BR is continuously required.

PRIOR ART DOCUMENT (Patent Document 1) U.S. Pat. No. 4,397,994A

DISCLOSURE OF THE INVENTION

Technical Problem

The present invention has been devised to solve the above-mentioned problems of the conventional technique, and an object of the present invention is to provide a modified conjugated diene-based polymer which has excellent processability and good mechanical properties such as tensile strength, and excellent viscoelasticity properties by including a derived unit from an N-containing aromatic hydrocarbon compound and a derived unit from an S-containing aromatic hydrocarbon compound or a derived unit from an S-containing heterocycle compound in a molecule.

In addition, another object of the present invention is to provide a method for preparing the modified conjugated diene-based polymer.

Also, another object of the present invention is to provide a rubber composition having excellent processability, abrasion resistance and rolling resistance by including the modified conjugated diene-based polymer.

Technical Solution

To solve the above-described tasks, according to an embodiment of the present invention, the present invention provides a modified conjugated diene-based polymer comprising: a repeating unit from a conjugated diene-based monomer; a derived unit from an N-containing aromatic hydrocarbon compound; and a derived unit from an S-containing aromatic hydrocarbon compound or an S-containing heterocycle compound, and satisfying the following conditions (i) and (ii):

(i) molecular weight distribution (PDI; MWD): 1.0 or more and less than 3.0; and
  (ii) the S content: 25 ppm or more based on a total weight of the polymer.

In addition, the present invention provides a method for preparing the modified conjugated diene-based polymer, comprising: a first polymerization reaction step for first polymerizing a first monomer and a second monomer in the presence of a polymerization initiator in a hydrocarbon solvent to prepare a first active polymer (S1); and a second polymerization reaction step for second polymerizing the first active polymer and a third monomer (S2), wherein the first monomer is a conjugated diene-based monomer, or a conjugated diene-based monomer and an aromatic vinyl-based monomer, the second monomer is an N-containing aromatic hydrocarbon compound, and the third monomer is an S-containing aromatic hydrocarbon compound or an S-containing heterocyclic compound.

Also, the present invention provides a rubber composition comprising the modified conjugated diene-based polymer and a filler.

Advantageous Effects

The modified conjugated diene-based polymer according to the present invention includes N atoms, S atoms and Si atoms in the specific contents or more in a molecule, and has effects of showing excellent processability, good mechanical properties such as tensile properties, and excellent viscoelasticity properties.

In addition, the method for preparing the modified conjugated diene-based polymer according to the present invention includes two steps of polymerization reactions including first polymerizing a first monomer and a second monomer, and second polymerizing by adding a third monomer, to prepare a highly modified conjugated diene-based polymer, advantageously.

Also, the rubber composition according to the present invention includes the modified conjugated diene-based polymer and shows excellent effects of processability, abrasion resistance and rolling resistance.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition of Terms

In the present disclosure, the term "polymer" refers to a polymer compound prepared by polymerizing monomers irrespective of the same or different types. Likewise, the general term polymer includes a term homopolymer which is commonly used for referring to a polymer prepared by only one type of monomer and a term copolymer.

In the present disclosure, the term "monovalent hydrocarbon group" may mean a monovalent atomic group obtained by bonding carbon and hydrogen in a monovalent alkyl group, alkenyl group, alkynyl group, cycloalkyl group, cycloalkyl group including one or more unsaturated bonds, and aryl group, and the minimum carbon number of a substituent represented by the monovalent hydrocarbon may be determined according to the type of each substituent.

In the present disclosure, the term "divalent hydrocarbon group" may mean a divalent atomic group obtained by bonding carbon and hydrogen in a divalent alkylene group, alkenylene group, alkynylene group, cycloalkylene group, cycloalkylene group including one or more unsaturated bonds and arylene group, and the minimum carbon number of a substituent represented by the divalent hydrocarbon may be determined according to the type of each substituent.

In the present disclosure, the term "alkyl group" may mean a monovalent aliphatic saturated hydrocarbon and may include both a linear alkyl group such as methyl, ethyl, propyl and butyl, and a branched alkyl group such as isopropyl, sec-butyl, tert-butyl and neo-pentyl.

In the present disclosure, the term "alkenyl group" may mean a monovalent aliphatic unsaturated hydrocarbon including one or two or more double bonds.

In the present disclosure, the term "alkynyl group" may mean a monovalent aliphatic unsaturated hydrocarbon including one or two or more triple bonds.

In the present disclosure, the term "alkylene group" may mean a divalent aliphatic saturated hydrocarbon such as methylene, ethylene, propylene and butylene.

In the present disclosure, the term "aryl group" may mean cyclic aromatic hydrocarbon and may include both monocyclic aromatic hydrocarbon in which one ring is formed and polycyclic aromatic hydrocarbon in which two or more rings are combined.

In the present disclosure, the term "heterocyclic group" is obtained by substituting carbon atoms in a cycloalkyl group or an aryl group with one or more heteroatoms and may mean both a heterocycloalkyl group and a heteroaryl group. The heteroatom may be N, O, S or Si.

The terms "comprising", and "having" and the derivatives thereof in the present disclosure, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods and Conditions

In the present disclosure, "weight average molecular weight (Mw)", and "number average molecular weight (Mn)" are measured through gel permeation chromatography (GPC) analysis. Molecular weight distribution (PDI, MWD, Mw/Mn) is calculated from each of the molecular weights measured. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In the present disclosure, the "Si content" is measured using an inductively coupled plasma optical emission spectroscopy (ICP-OES; Optima 7300DV) as an ICP analysis method. If the inductively coupled plasma optical emission spectroscopy is used, measurement is performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr);
2) step 2: initial temp 180° C., rate (temp/hr) 85° C./hr, temp (holdtime) 370° C. (2 hr); and
3) step 3: initial temp 370° C., rate (temp/hr) 47° C./hr, temp (holdtime) 510° C. (3 hr), adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml of ultrapure water, and performing incineration.

In the present disclosure, the "N content" may be obtained by measuring the N content through an NSX analysis method, and measurement by the NSX analysis method may use a quantitative analyzer of a trace amount of nitrogen (NSX-2100H) For example, in case of using the quantitative analyzer of a trace amount of nitrogen, the quantitative analyzer of a trace amount of nitrogen (Auto sampler, Horizontal furnace, PMT & Nitrogen detector) is turned on, carrier gas flow amounts are set to 250 ml/min for Ar, 350 ml/min for $O_2$, and 300 ml/min for ozonizer, a heater is set to 800° C., and the analyzer is stood for about 3 hours for stabilization. After stabilizing the analyzer, calibration curves of calibration curve ranges of 5 ppm, 10 ppm, 50 ppm, 100 ppm and 500 ppm are made using Nitrogen standard (AccuStandard S-22750-01-5 ml), and an area corresponding to each concentration is obtained. Then, by using the ratios of concentrations to areas, a straight line is made. After that, a ceramic boat holding 20 mg of a specimen is put in the auto sampler of the analyzer and measurement is conducted to obtain an area. By using the area of the specimen thus obtained and the calibration curve, the N content is calculated. In this case, the specimen is a modified conjugated diene-based polymer from which solvents are removed by putting the specimen in hot water heated by steam and stirring, and may be a specimen from which remaining monomers, remaining modifiers and oil are removed.

In the present disclosure, the "S content" is measured through a combustion ion chromatography (C-IC) analysis method, and the combustion ion chromatography analysis is measured using ICS2100/AQF-2100H. Particularly, the combustion ion chromatography uses IonPac AS18(4×250 mm) as a column and a suppressed conductivity detector as a detector, sets a supply current to 76 mA, and sets a solvent such that 30.05 mM of KOH is injected in a flow rate of 1 ml/min. The combustion temperature is set such that an inlet is 900° C., and an outlet is 1,000° C., and the flow rates of carrier gases are set to 200 ml/min for an Ar gas, and 400 ml/min for an $O_2$ gas. After stabilizing the analyzer, a standard material (ERM-EC680K or ERM-EC681M) is analyzed to make a calibration curve. After that, a boat containing 50 mg of a specimen is burnt and passed through an aqueous solution including an absorbent ($H_2O_2$ 900 mg/kg) to dilute to a final volume of 10 ml, 100 µl of the diluted sample is collected and passed through the analyzer, and the S content coming out is calculated using the calibration curve of the standard material.

Modified Conjugated Diene-Based Polymer

The present invention provides a modified conjugated diene-based polymer which has excellent processability and excellent tensile properties and viscoelasticity properties.

The modified conjugated diene-based polymer according to an embodiment of the present invention is characterized in comprising: a repeating unit from a conjugated diene-based monomer; a derived unit from an N-containing aromatic hydrocarbon compound; and a derived unit from an S-containing aromatic hydrocarbon compound or an S-containing heterocycle compound, and satisfying the following conditions (i) and (ii):
(i) molecular weight distribution (PDI; MWD): 1.0 or more and less than 3.0; and
(ii) the S content: 25 ppm or more based on a total weight of the polymer.

According to an embodiment of the present invention, the modified conjugated diene-based polymer includes a repeating unit derived from a conjugated diene-based monomer, a derived unit from an N-containing aromatic hydrocarbon compound, and a derived unit from an S-containing aromatic hydrocarbon compound or a derived unit from an S-containing heterocycle compound, wherein the repeating unit derived from the conjugated diene-based monomer may mean a repeating unit formed by a conjugated diene-based monomer during polymerization.

In addition, each of the N-containing aromatic hydrocarbon compound, the S-containing aromatic hydrocarbon compound and the S-containing heterocycle compound may be modification monomers which may be polymerized together with the conjugated diene-based monomer to form a polymer chain and to introduce functional groups into the polymer chain, and each of the derived unit from the N-containing aromatic hydrocarbon compound, the derived unit from the S-containing aromatic hydrocarbon compound and the derived unit from the S-containing heterocycle compound may mean a functional group derived from each compound present in the polymer chain during polymerizing each compound.

In another embodiment, the derived unit from the N-containing aromatic hydrocarbon compound may be present in a polymer chain including the repeating unit derived from the conjugated diene-based monomer, or may be present in at least one terminal of the polymer chain.

In addition, the derived unit from the S-containing aromatic hydrocarbon compound or the derived unit from the S-containing heterocycle compound may be present in a polymer chain including the repeating unit derived from the conjugated diene-based monomer or at one terminal thereof.

In another embodiment, the modified conjugated diene-based polymer may further include a functional group derived from an aminoalkoxysilane-based modifier, and in this case, the modified conjugated diene-based polymer includes the repeating unit derived from the conjugated diene-based monomer, the derived unit from the N-containing aromatic hydrocarbon compound, and the derived unit from the S-containing aromatic hydrocarbon compound or the derived unit from the S-containing heterocycle compound, and may further include the functional group derived from the aminoalkoxysilane-based modifier.

In addition, in the case where the modified conjugated diene-based polymer includes the functional group derived from the modifier, the derived unit from the N-containing aromatic hydrocarbon compound may be present in a polymer chain including the repeating unit derived from the conjugated diene-based monomer or at one terminal thereof, the derived unit from the S-containing aromatic hydrocarbon compound or the derived unit from the S-containing heterocycle compound may be present in a polymer chain, and the functional group derived from the modifier may be present at the other terminal of the polymer chain. That is, the modified conjugated diene-based polymer according to an embodiment of the present invention may be a both terminal-modified conjugated diene-based polymer of which both terminals are modified. In this case, the modified conjugated diene-based polymer according to an embodiment of the present invention includes N atoms which have even better affinity with a filler at both terminals, and the affinity with the filler may be further improved, and as a result, even better effects of processability, mechanical properties and viscoelasticity properties may be shown.

In addition, according to another embodiment of the present invention, the modified conjugated diene-based polymer may further include a repeating unit derived from an aromatic vinyl-based monomer, and in this case, the modified conjugated diene-based polymer may be a copolymer including the repeating unit derived from the conjugated diene-based monomer, the repeating unit derived from the aromatic vinyl-based monomer, the derived unit from the N-containing aromatic hydrocarbon compound, and the derived unit from the S-containing aromatic hydrocarbon compound or the S-containing heterocycle compound, and further including a functional group derived from a modifier, as necessary. Here, the repeating unit derived from the aromatic vinyl-based monomer may mean a repeating unit which is formed from the aromatic vinyl-based monomer during polymerization.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

As the aromatic vinyl-based monomer, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene and 3-(2-pyrrolidino-1-methyl ethyl)-α-methylstyrene.

In another embodiment, the modified conjugated diene-based polymer may be a copolymer further including a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, the copolymer may be a random copolymer, and in this case, excellent balance effects among physical properties may be shown. The random copolymer may mean the arrangement of repeating units forming the copolymer in disorder.

The modified conjugated diene-based polymer according to an embodiment of the present invention may satisfy molecular weight distribution (PDI; MWD) of 1.0 or more to less than 3.0, particularly, 1.1 or more to less than 2.0, or 1.1 or more to less than 1.7 or less. Within this range, excellent effects of rolling resistance and wet skid resistance, and balance among physical properties may be achieved.

In addition, the modified conjugated diene-based polymer may have a number average molecular weight (Mn) of 1,000 g/mol to 2,000,000 g/mol, 10,000 g/mol to 1,000,000 g/mol, or 100,000 g/mol to 800,000 g/mol, a weight average molecular weight (Mw) of 1,000 g/mol to 3,000,000 g/mol, 10,000 g/mol to 2,000,000 g/mol, or 100,000 g/mol to 2,000,000 g/mol, and a peak average molecular weight (Mp) of 1,000 g/mol to 3,000,000 g/mol, 10,000 g/mol to 2,000,000 g/mol, or 100,000 g/mol to 2,000,000 g/mol.

In another embodiment, the modified conjugated diene-based polymer may satisfy a unimodal shape molecular weight distribution curve by gel permeation chromatography (GPC). This is a molecular weight distribution curve shown in a polymer polymerized by continuous type polymerization and may mean that the modified conjugated diene-based polymer has uniform properties. That is, the modified conjugated diene-based polymer according to an embodiment of the present invention may be prepared by continuous type polymerization and may have a unimodal shape molecular weight distribution curve and molecular weight distribution of 1.0 or more and less than 3.0.

In addition, the modified conjugated diene-based polymer satisfies the S content of 25 ppm or more, 25 ppm to 2,000 ppm, or 100 ppm to 1,000 ppm based on the total weight of the polymer, and within this range, the mechanical properties such as tensile properties of the modified conjugated diene-based polymer may be even better. Meanwhile, the S content in the polymer means the content of S atoms, and the S atom and the content thereof may be derived from the S-containing aromatic hydrocarbon compound or the S-containing heterocycle compound.

In another embodiment, the modified conjugated diene-based polymer may have each of the Si content and the N content of 50 ppm or more, 100 ppm or more, 100 ppm to 500 ppm, or 100 ppm to 300 ppm based on the total weight of the polymer, and within this range, excellent effects of the mechanical properties such as the tensile properties and viscoelasticity properties of a rubber composition including the modified conjugated diene-based polymer may be achieved. Meanwhile, the Si content and the N content in the polymer mean the contents of the Si atoms and N atoms present in the polymer, respectively, and the Si atom and the content thereof may be derived from the modifier, and the N atom and the content thereof may be derived from the N-containing aromatic hydrocarbon compound and the modifier.

In another embodiment, the modified conjugated diene-based polymer may have a measured mooney stress relaxation ratio of 0.5 or more, 0.5 to 3.0, 0.5 to 2.5, or 0.5 to 2.0.

Here, the mooney stress relaxation ratio represents the change of stress shown as a reaction to the same amount of strain, and may be measured using a mooney viscometer. Particularly, the mooney stress relaxation ratio was obtained by using MV2000E of Monsanto Co. using Large Rotor at a rotor speed of 2±0.02 rpm at 100° C. A polymer used was stood at room temperature (23±5° C.) for 30 minutes or more, 27±3 g of the specimen was collected and put in a die cavity, a platen was operated, and then, the mooney viscosity was measured while applying torque. Then, the slope value of the change of the mooney viscosity shown while releasing torque was measured, and the mooney stress relaxation ratio was obtained.

Meanwhile, the mooney stress relaxation ratio may be used as the index of the branch structure of a corresponding polymer, and may be used as the index of the degree of branching, because, for example, if polymers having the same mooney viscosity are compared, the mooney relaxation ratio decreases with the increase of branches.

In addition, the modified conjugated diene-based polymer may have mooney viscosity at 100° C. of 30 or more, 40 to 150, or 40 to 140, and within this range, excellent effects of processability and productivity may be achieved.

In addition, the modified conjugated diene-based polymer may have the vinyl content of 5 wt % or more, 10 wt % or more, or 10 wt % to 60 wt %. Here, the vinyl content may mean the content of not 1,4-added but 1,2-added conjugated diene-based monomer based on 100 wt % of the conjugated diene-based copolymer composed of a monomer having a vinyl group and an aromatic vinyl-based monomer.

Meanwhile, the N-containing aromatic hydrocarbon compound according to an embodiment of the present invention may be a compound represented by Formula 1 below, and may be polymerized with a monomer to introduce a functional group into a polymer chain while forming the polymer chain.

[Formula 1]

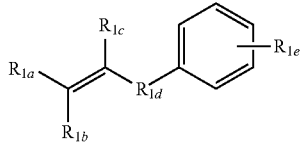

In Formula 1,
$R_{1a}$ to $R_{1c}$ are each independently a hydrogen atom; an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; or a heterocyclic group of 3 to 20 carbon atoms,
$R_{1d}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, and
$R_{1e}$ is an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a substituent represented by Formula 1a below.

[Formula 1a]

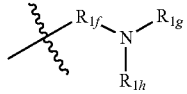

In Formula 1a,
$R_{1f}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, and
$R_{1g}$ and $R_{1h}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a monosubstituted, disubstituted or trisubstituted alkylsilyl group substituted with an alkyl group of 1 to 10 carbon atoms, or $R_{1g}$ and $R_{1h}$ are connected with each other to form together with N, a substituted with an alkyl group of 1 to 10 carbon atoms or unsubstituted heterocyclic group of 2 to 10 carbon atoms.

Particularly, in Formula 1, $R_{1a}$ to $R_{1c}$ may be each independently a hydrogen atom; an alkyl group of 1 to 10 carbon atoms; an alkenyl group of 2 to 10 carbon atoms; an alkynyl group of 2 to 10 carbon atoms; a heteroalkyl group of 1 to 10 carbon atoms, a heteroalkenyl group of 2 to 10 carbon atoms; a heteroalkynyl group of 2 to 10 carbon atoms; a cycloalkyl group of 5 to 10 carbon atoms; an aryl group of 6 to 10 carbon atoms; or a heterocyclic group of 3 to 10 carbon atoms, $R_{1d}$ may be a single bond, or an unsubstituted alkylene group of 1 to 10 carbon atoms, and $R_{1e}$ may be an alkyl group of 1 to 10 carbon atoms; an alkenyl group of 2 to 10 carbon atoms; an alkynyl group of 2 to 10 carbon atoms; a heteroalkyl group of 1 to 10 carbon atoms; a heteroalkenyl group of 2 to 10 carbon atoms; a heteroalkynyl group of 2 to 10 carbon atoms; a cycloalkyl group of 5 to 10 carbon atoms; an aryl group of 6 to 10 carbon atoms; a heterocyclic group of 3 to 10 carbon atoms; or a substituent represented by Formula 1a. In Formula 1a, $R_{1f}$ may be a single bond, or an unsubstituted alkylene group of 1 to 10 carbon atoms, and $R_{1g}$ and $R_{1h}$ may be each independently an alkyl group of 1 to 10 carbon atoms; an alkenyl group of 2 to 10 carbon atoms; an alkynyl group of 2 to 10 carbon atoms; a heteroalkyl group of 1 to 10 carbon atoms; a heteroalkenyl group of 2 to 10 carbon atoms; a heteroalkynyl group of 2 to 10 carbon atoms; a cycloalkyl group of 5 to 10 carbon atoms; an aryl group of 6 to 10 carbon atoms; a heterocyclic group of 3 to 10 carbon atoms; or a monosubstituted, disubstituted or trisubstituted alkylsilyl group substituted with an alkyl group of 1 to 6 carbon atoms, or $R_{1g}$ and $R_{1h}$ may be connected with each other to form together with N, a substituted with an alkyl group of 1 to 6 carbon atoms or unsubstituted heterocyclic group of 2 to 10 carbon atoms.

In another embodiment, in Formula 1, $R_{1a}$ to $R_{1c}$ may be each independently a hydrogen atom; an alkyl group of 1 to 6 carbon atoms, $R_{1d}$ may be a single bond, or an unsubstituted alkylene group of 1 to 6 carbon atoms, and $R_{1e}$ may be an alkyl group of 1 to 10 carbon atoms or a substituent represented by Formula 1a. In Formula 1a, $R_{1f}$ may be a single bond, or an unsubstituted alkylene group of 1 to 6 carbon atoms, and $R_{1g}$ and $R_{1h}$ may be each independently an alkyl group of 1 to 10 carbon atoms or a trialkylsilyl group substituted with an alkyl group of 1 to 6 carbon atoms; or $R_{1g}$ and $R_{1h}$ may be connected with each other to form together with N, a substituted with an alkyl group of 1 to 3 carbon atoms or unsubstituted heterocyclic group of 2 to 6 carbon atoms.

More particularly, the compound represented by Formula 1 may be one or more selected from the compounds represented by Formula 1-1 to Formula 1-3 below.

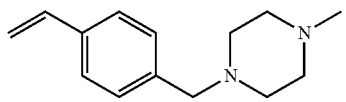

[Formula 1-1]

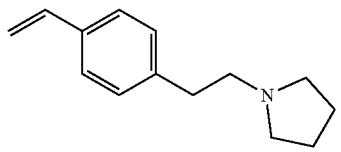

[Formula 1-2]

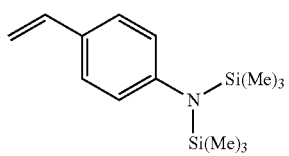

[Formula 1-3]

In Formula 1-3, Me is a methyl group.

In addition, the S-containing aromatic hydrocarbon compound may be a compound represented by Formula 2 below.

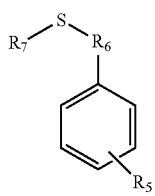

[Formula 2]

In Formula 2,

R$_5$ is a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 5 to 30 carbon atoms; or a heterocyclic group of 3 to 30 carbon atoms, R$_6$ is a single bond; or an alkylene group of 1 to 20 carbon atoms, and R$_7$ is an alkenyl group of 2 to 30 carbon atoms.

Particularly, in Formula 2, R$_5$ may be a hydrogen atom; an alkyl group of 1 to 10 carbon atoms; or a heteroalkyl group of 1 to 10 carbon atoms, R$_6$ may be a single bond; or an alkylene group of 1 to 10 carbon atoms, and R$_7$ may be an alkenyl group of 2 to 10 carbon atoms.

More particularly, the compound represented by Formula 2 may be a compound represented by Formula 2-1 below.

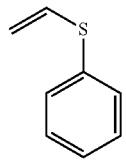

[Formula 2-1]

In addition, the S-containing heterocycle compound may be a compound represented by Formula 3 below.

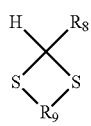

[Formula 3]

In Formula 3,

R$_8$ is a hydrogen atom, a substituted with a substituent X or unsubstituted alkyl group of 1 to 20 carbon atoms, a substituted with a substituent X or unsubstituted cycloalkyl group of 1 to 20 carbon atoms, or a substituted with a substituent X or unsubstituted aryl group of 6 to 30 carbon atoms, R$_9$ is a substituted with a substituent X or unsubstituted alkylene group of 1 to 5 carbon atoms, and the substituent X is selected from the group consisting of a hydroxyl group (—OH), a halogen group, a primary amino group (—NH$_2$) and a secondary amino group (—NHR'), in the case where X is the secondary amino group, R' is an alkyl group of 1 to 10 carbon atoms.

Particularly, in Formula 3, R$_8$ may be an unsubstituted alkyl group of 1 to 10 carbon atoms, an unsubstituted cycloalkyl group of 1 to 10 carbon atoms, or an unsubstituted aryl group of 6 to 12 carbon atoms, and R$_9$ may be an unsubstituted alkylene group of 1 to 3 carbon atoms.

More particularly, the compound represented by Formula 3 may be a compound represented by Formula 3-1 below.

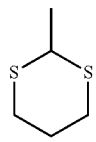

[Formula 3-1]

In addition, the modifier according to the present invention may be a modifier for modifying at least one terminal of the conjugated diene-based polymer, particularly, a modifier having affinity with silica. The modifier having affinity with silica may mean a modifier containing a functional group having affinity with silica in a compound used as the modifier, and the functional group having affinity with silica may have excellent affinity with a filler, particularly, a silica-based filler, and may mean a functional group which is capable of interaction between the silica-based filler and the functional group derived from the modifier.

Particularly, according to an embodiment of the present invention, the aminoalkoxysilane-based modifier may be a compound represented by Formula 4 below.

$(R_{24}\!-\!\!-\!\!R_{23}\!-\!\!)_b\!-\!\!N\!-\!\!(\!R_{20}\!-\!\!Si(OR_{21})_a(R_{22})_{3-a})_c$  [Formula 4]

In Formula 4, $R_{20}$ is a single bond, or an alkylene group of 1 to 10 carbon atoms, $R_{21}$ and $R_{22}$ are each independently an alkyl group of 1 to 10 carbon atoms, $R_{23}$ is a single bond or an alkylene group of 1 to 10 carbon atoms, $R_{24}$ is hydrogen, an alkyl group of 1 to 10 carbon atoms, or an alkylsilyl group disubstituted, trisubstituted or tetrasubstituted with alkyl groups of 1 to 10 carbon atoms, a is an integer of 2 or 3, c is an integer of 1 to 3, and b is an integer of 0 to 2, where b+c=3 may be satisfied.

In a particular embodiment, in Formula 4, $R_{20}$ may be a single bond, or an alkylene group of 1 to 5 carbon atoms, $R_{21}$ and $R_{22}$ may be each independently an alkyl group of 1 to 5 carbon atoms, $R_{23}$ may be a single bond or an alkylene group of 1 to 5 carbon atoms, $R_{24}$ may be hydrogen, an alkyl group of 1 to 5 carbon atoms, or a trialkylsilyl group substituted with an alkyl group of 1 to 5 carbon atoms, a may be an integer of 2 or 3, c may be an integer of 1 to 3, and b may be an integer of 0 to 2, where b+c=3 may be satisfied.

In a more particular embodiment, the compound represented by Formula 4 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, N,N-dimethyl-3-(trimethoxysilyl)propan-1-amine, N,N-diethyl-3-(trimethoxysilyl)propan-1-amine, N,N-diethyl-3-(triethoxysilyl)propan-1-amine, tri(trimethoxysilyl)amine, tri-(3-(trimethoxysilyl)propyl)amine, N,N-bis(3-(diethoxy(methyl)silyl)propyl)-1,1,1-trimethlysilanamine and 3-(dimethoxy(methyl)silyl)-N,N-diethylpropane-1-amine.

Method for Preparing Modified Conjugated Diene-Based Polymer

In addition, the present invention provides a method for preparing the modified conjugated diene-based polymer.

The modified conjugated diene-based polymer according to an embodiment of the present invention is prepared by a preparation method described below, and may have narrow molecular weight distribution of 1.0 or more to less than 3.0, the S content, Si content and N content in a molecule in the aforementioned ranges, and accordingly, good tensile properties and viscoelasticity properties as well as excellent processability in balance.

The method for preparing the modified conjugated diene-based polymer according to an embodiment of the present invention is characterized in including: a first polymerization reaction step for first polymerizing a first monomer and a second monomer in the presence of a polymerization initiator to prepare a first active polymer (S1); and a second polymerization reaction step for second polymerizing the first active polymer and a third monomer (S3), wherein the first monomer is a conjugated diene-based monomer, or a conjugated diene-based monomer and an aromatic vinyl-based monomer, the second monomer is an N-containing aromatic hydrocarbon compound, and the third monomer is an S-containing aromatic hydrocarbon compound or a S-containing heterocyclic compound.

In addition, the preparation method may further include a step of adding an aminoalkoxysilane-based modifier and performing modification reaction after step (S2).

The conjugated diene-based monomer, aromatic vinyl-based monomer, N-containing aromatic hydrocarbon compound, S-containing aromatic hydrocarbon compound, S-containing heterocycle compound and aminoalkoxysilane-based modifier, used in the preparation method are the same as described above, and the explanation thereon will be omitted.

The hydrocarbon solvent is not specifically limited and may be, for example, one or more selected from the group consisting of n-pentane, n-hexane, n-heptane, isooctane, cyclohexane, toluene, benzene and xylene.

The polymerization initiator is not specifically limited, and may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyllithium, n-eicosyl lithium, 4-butylphenyl lithium, 4-tolyllithium, cyclohexyllithium, 3,5-di-n-heptylcyclohexyllithium, cyclopentyllithium, naphthylsodium, naphthylpotassium, lithium alkoxide, sodium alkoxide, potassium alkoxide, lithium sulfonate, sodium sulfonate, potassium sulfonate, lithium amide, sodium amide, potassium amide and lithium isopropylamide.

According to an embodiment of the present invention, the polymerization initiator may be used in 0.01 mmol to 10 mmol, 0.05 mmol to 5 mmol, 0.1 mmol to 2 mmol, 0.1 mmol to 1 mmol, or 0.15 mmol to 0.8 mmol based on total 100 g of the monomer. Here, the total 100 g of the monomer may represent the total amount of the first monomer, the second monomer and the third monomer.

In addition, according to an embodiment of the present invention, each of the second monomer and the third monomer may be used in 0.01 g to 10 g, or 0.1 g to 1 g based on 100 g of the first monomer. In this case, the S content in the polymer prepared may be easily controlled in the aforementioned range, and a polymer having even better tensile properties may be prepared.

Meanwhile, in the case where the compound represented by Formula 3 is used as the third monomer, the compound represented by Formula 3 may participate in polymerization reaction after being lithiated as in exemplary Reaction 1 below (Corey-Seebach reaction).

[Reaction 1]

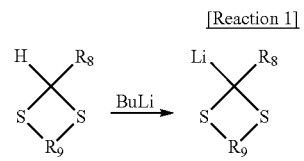

In Reaction 1, $R_8$ and $R_9$ are the same as described above.

The first polymerization reaction and the second polymerization reaction in step (S1) and step (S2) may be, for example, anionic polymerization, and in a particular embodiment, living anionic polymerization by which an anionic active part is formed at a polymerization terminal through propagation polymerization reaction by anions. In addition, the first polymerization reaction and second polymerization reaction of step (S1) and step (S2) may be polymerization with heating, isothermal polymerization, or polymerization at a constant temperature (adiabatic polymerization). The polymerization at a constant temperature may mean a polymerization method including a step of polymerizing using self-generated heat of reaction without arbitrarily applying heat after injecting a polymerization initiator, and the polymerization with heating may mean a polymerization method including injecting the polymerization initiator and then, increasing the temperature by arbitrarily applying heat. The isothermal polymerization may mean a polymerization method by which the temperature of a polymer is kept constant by increasing heat by applying heat or taking heat after adding the polymerization initiator.

In addition, according to an embodiment of the present invention, the first polymerization reaction of step (S1) may be performed by further including a diene-based compound of 1 to 10 carbon atoms in addition to the conjugated diene-based monomer, and in this case, effects of preventing the formation of gel on the wall of a reactor during operation for a long time may be achieved. The diene-based compound may include, for example, 1,2-butadiene.

Each of the first polymerization reaction and the second polymerization reaction of step (S1) and step (S2) may be conducted in a temperature range of 100° C. or less, −20° C. to 90° C., 0° C. to 80° C., 0° C. to 70° C., or 10° C. to 70° C. Within the range, the molecular weight distribution of a polymer is controlled narrow, and excellent effects of the improving effects of physical properties is achieved.

In addition, the first polymerization reaction and the second polymerization reaction of step (S1) and step (S2) may be performed by batch type polymerization or continuous type polymerization, or the batch type polymerization and the continuous type polymerization may be performed in combination, as necessary, such that the first polymerization reaction is performed by batch type, and the second polymerization reaction is performed by continuous type polymerization.

In addition, whatever the first polymerization reaction and the second polymerization reaction of step (S1) and step (S2) are performed by the batch type polymerization or the continuous type polymerization, the modified conjugated diene-based polymer according to the present invention may be prepared by firstly polymerizing the first monomer and the second monomer, and then secondly polymerizing after adding the third monomer.

For example, if step (S1) and step (S2) are performed by the batch type polymerization, a hydrocarbon solvent, a polymerization initiator, a first monomer and a second monomer may be injected into a polymerization reactor, first polymerization may be performed to prepare a first active polymer, and then, a third monomer may be injected thereto, and second polymerization may be performed.

In another embodiment, if step (S1) and step (S2) are performed by continuous type polymerization, by using two or more polymerization reactors, the first monomer and the second monomer may be injected in a first reactor among the polymerization reactors, first polymerization reaction may be performed, the third monomer may be injected into a second reactor, and second polymerization reaction may be performed. That is, in the preparation method, the third monomer may be injected after performing the polymerization reaction of the first monomer and the second monomer for a certain time so as to participate in the polymerization.

In the preparation method according to the present invention, the positions of the first monomer, the second monomer and the third monomer in a polymer chain formed may be controlled by the time difference of the participation of the monomers in polymerization. For example, the polymerization of the second monomer may be performed with the first polymer from an initiation point of polymerization, and the derived unit from the second monomer may be positioned at one terminal part of a polymer chain. The derived unit from the third monomer derived by the polymerization of the third monomer which is injected afterward and participates in polymerization may be positioned at the other terminal part of the polymer chain. Meanwhile, since a very small amount of the second monomer is used for polymerization, according to the progress of polymerization, the derived unit from the second monomer may be positioned at one terminal part of the polymer chain, for example, at a part formed with the initiation of polymerization. After that, according to the progress of polymerization continuously, a polymer chain in which only the derived unit from the first monomer is formed, may be prepared.

In addition, if the preparation method includes modification reaction, by performing the modification reaction after the aforementioned first polymerization reaction and the second polymerization reaction, a modified conjugated diene-based polymer having a structure including a derived unit from the second monomer at one terminal of a polymer chain, and a derived unit from the third monomer at the other terminal of the polymer chain, and including a functional group derived from a modifier at a terminal part where the derived unit from the third monomer is present, may be prepared, and since the modified conjugated diene-based polymer has the structure, the tensile properties and viscoelasticity properties may become excellent in balance.

In another embodiment, the method for preparing the modified conjugated diene-based polymer may be performed in a plurality of reactors including two or more polymerization reactors and a modification reactor by a continuous type polymerization method. For example, step (S1) and step (S2) may be performed continuously in two or more polymerization reactors including a first reactor, and the number of the polymerization reactors may be flexibly determined according to reaction conditions and environment. The continuous type polymerization method may mean reaction processes of continuously supplying reactants to a reactor and continuously discharging reaction products thus produced. By the continuous type polymerization method, productivity and processability may be excellent, and effects of excellent uniformity of the polymer thus prepared may be achieved.

In addition, according to an embodiment of the present invention, if the active polymer is continuously prepared in the polymerization reactor, a polymerization conversion ratio in the first reactor may be 50% or less, 10% to 50%, or 20% to 50%, and within this range, side reactions generated while forming a polymer after initiating polymerization reaction may be restrained, and a polymer with a linear structure may be induced during polymerization. Thus, the molecular weight distribution of the polymer may be controlled narrow, and effects of excellent improvement of physical properties may be achieved.

In this case, the polymerization conversion ratio may be controlled according to the reaction temperature, the retention time in the reactor, or the like.

The polymerization conversion ratio may be determined, for example, by measuring the solid concentration in a polymer solution phase including the polymer during polymerizing a polymer. In a particular embodiment, in order to secure the polymer solution, a cylinder type container is installed at the outlet of each polymerization reactor to fill a certain amount of the polymer solution in the cylinder type container. Then, the cylinder type container is separated from the reactor, the weight (A) of the cylinder filled with the polymer solution is measured, the polymer solution filled in the cylinder type container is transported to an aluminum container, for example, an aluminum dish, the weight (B) of the cylinder type container from which the polymer solution is removed is measured, the aluminum container containing the polymer solution is dried in an oven of 140° C. for 30 minutes, the weight (C) of a dried polymer is measured, and calculation is performed according to Mathematical Equation 1 below.

Polymerization conversion ratio (%) =

$$\frac{\text{weight}(C)}{\left[\begin{array}{c}(\text{weight}(A)-\text{weight}(B))\times\\ \text{total solid content of each reactor (wt \% TSC)}\end{array}\right]}\times 100$$

[Mathematical Equation 1]

In Mathematical Equation 1, the total solid content is the total solid (monomer) content in a polymerization solution separated from each reactor and is the percent by weight of a solid with respect to 100% of the polymer solution. For example, if the total solid content is 20 wt %, and if this is applied to Mathematical Equation 1, 10/100, i.e., 0.2 may be substituted for calculation.

Meanwhile, the polymerization reactant polymerized in the first reactor may be transported to polymerization reactors before a modification reactor in order, and polymerization may be performed until the final polymerization conversion ratio becomes 95% or more. After performing the polymerization in the first reactor, the polymerization conversion ratios of the second reactor, or each reactor from the second reactor to the polymerization reactor before the modification reactor may be suitably controlled to control molecular weight distribution.

Meanwhile, in step (S1), during preparing the active polymer, the retention time of a polymerization reactant in the first reactor may be from 1 minute to 40 minutes, from 1 minute to 30 minutes, or from 5 minutes to 30 minutes, and within this range, the control of the polymerization conversion ratio is easy, and thus, the molecular weight distribution of the polymer is possibly controlled narrow, and excellent effects of improving physical properties may be obtained.

The term "polymerization reactant" used in the present invention may mean an intermediate of a polymer type, which is under polymerization in each reactor or may mean a polymer with a polymerization conversion ratio of less than 95% under polymerization in a reactor.

According to an embodiment of the present invention, the molecular weight distribution (PDI, polydispersed index; MWD, Mw/Mn) of the active polymer prepared in step (S1) may be less than 2.0, from 1.0 to less than 1.7, or from 1.1 to less than 1.6, and within this range, the molecular weight distribution of a modified conjugated diene-based polymer which is prepared via a modification reaction or coupling with a modifier is narrow, and improving effects of physical properties may be excellent.

Meanwhile, the polymerization of step (S1) may be performed by including a polar additive, and the polar additive may be added in a ratio of 0.001 g to 50 g, 0.001 g to 10 g, or 0.005 g to 0.1 g based on total 100 g of the monomer. In another embodiment, the polar additive may be added in a ratio of 0.001 g to 10 g, 0.005 g to 5 g, or 0.005 g to 4 g based on total 1 mmol of the polymerization initiator.

The polar additive may be, for example, one or more selected from the group consisting of tetrahydrofuran, 2,2-di(2-tetrahydrofuryl)propane, diethyl ether, cyclopentyl ether, dipropyl ether, ethylene methyl ether, ethylene dimethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine, N,N,N',N'-tetramethylethylenediamine, sodium mentholate, and 2-ethyl tetrahydrofufuryl ether, and may preferably be 2,2-di(2-tetrahydrofuryl)propane, triethylamine, tetramethylethylenediamine, sodium mentholate, or 2-ethyl tetrahydrofufuryl ether. If the polar additive is included, and if a conjugated diene-based monomer and an aromatic vinyl-based monomer are copolymerized, the difference of their reaction rates may be compensated, and effects of inducing easy formation of a random copolymer may be achieved.

According to an embodiment of the present invention, the reaction or coupling of step (S2) may be performed in a modification reactor, and in this case, the modifier may be used in an amount of 0.01 mmol to 10 mmol based on total 100 g of the monomer. In another embodiment, the modifier may be used in 0.1 mol to 10 mol, 0.1 mol to 5 mol, or 0.1 mol to 3 mol, based on 1 mol of the polymerization initiator of step (S1).

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction or coupling may be performed by the mixing of the active polymer and the modifier in the transporting part.

The method for preparing a modified conjugated diene-based polymer according to an embodiment of the present invention is a method satisfying the properties of the above-described modified conjugated diene-based polymer. Effects intended to achieve in the present invention may be achieved if the above properties are satisfied as described above, but in at least in the preparation method, a polymerization conversion ratio during transporting from the first reactor to the second reactor under continuous type process is required to be satisfied and by controlling other polymerization conditions diversely, the physical properties of the modified conjugated diene-based polymer according to the present invention may be accomplished.

Also, the present invention provides a rubber composition including the modified conjugated diene-based polymer.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance among physical properties may be achieved.

In addition, the rubber composition may further include other rubber components, as necessary, in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based polymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture two or more thereof may be used.

The rubber composition may include a filler in 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effects of destruction characteristics and compatible effects of wet grip. In addition, the rubber composition may further include a carbon-based filler, if necessary.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is brought in an active part is used as a rubber component, the mixing amount of the silane coupling agent may be smaller than a common case. Thus, the silane coupling agent may be used in 1 part by weight to 20 parts by weight, or 5 parts by weight to 15 parts by weight based on 100 parts by weight of silica. Within the above range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in 0.1 parts by weight to 10 parts by weight based on 100 parts by weight of a rubber component. Within the above range, elasticity and strength required for a vulcanized rubber composition may be secured, and at the same time, a low fuel consumption ratio may be excellent.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG), in 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio)methyl)-4-nonylphenol or 2-methyl-4,6-bis((octylthio)methyl)phenol, and may be used in 0.1 parts by weight to 6 parts by weight based on 100 parts by weight of a rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

Hereinafter, the present invention will be explained in detail referring to embodiments. However, embodiments according to the present invention may be modified into various other types, and the scope of the present invention should not be limited to the embodiments described below. The embodiments of the present invention are provided for more completely explaining the present invention to a person having an average knowledge in the art.

Example 1

To a first reactor among continuous reactors of three reactors connected in series, injected were a styrene solution in which 60 wt % of styrene was dissolved in n-hexane in a rate of 2.67 kg/h, a 1,3-butadiene solution in which 60 wt % of 1,3-butadiene was dissolved in n-hexane in a rate of 11.2 kg/h, a second monomer solution in which 15 wt % of 1-methyl-4-(4-vinylbenzyl)piperazine (Sigma-Aldrich) was dissolved in n-hexane in a rate of 72.04 g/h, n-hexane in a rate of 46.28 kg/h, a solution in which 10 wt % of 2,2-(di (2-tetrahydrofuryl)propane was dissolved in n-hexane as a polar additive in a rate of 35.0 g/h, and a n-butyllithium solution in which 6.6 wt % of n-butyllithium was dissolved in n-hexane in a rate of 90.91 g/h. In this case, the temperature of the first reactor was maintained to 65° C., and at a point where a polymerization conversion ratio reached 45%, a polymerization reactant was transported from the first reactor to a second reactor via a transport pipe.

Then, to the second reactor, a 1,3-butadiene solution in which 60 wt % of 1,3-butadiene was dissolved in n-hexane was injected in a rate of 2.95 kg/h, and a third monomer solution in which 5 wt % of phenyl(vinyl)sulfide (CAS No. 1822-73-7, Sigma-Aldrich) was dissolved in n-hexane was injected in a rate of 25.52 g/h. In this case, the temperature of the second reactor was maintained to 75° C., and at a point where a polymerization conversion ratio reached 95% or more, a polymerization reactant was transported from the second reactor to a third reactor via a transport pipe.

The polymerization reactant was transported from the second reactor to the third reactor, and a solution in which 20 wt % of N,N-dimethyl-3-(trimethoxysilyl)propan-1-amine was dissolved as a modifier was continuously injected to a third reactor in a rate of 60.0 g/h. The temperature of the third reactor was maintained to 65° C.

After that, to a polymerization solution discharged from the third reactor, an IR1520 (BASF Co.) solution in which 30 wt % of an antioxidant was dissolved, was injected in a rate of 166.67 g/h and stirred. The polymer thus obtained was injected into hot water heated with steam and stirred to remove solvents to prepare a modified conjugated diene-based polymer.

Example 2

A modified conjugated diene-based polymer was prepared by performing the same method as in Example 1 except for continuously supplying a solution in which 5 wt % of 2-methyl-1,3-dithiane (CAS No. 6007-26-7, Sigma-Aldrich) was dissolved in n-hexane as the third monomer solution in a rate of 25.25 g/h to the second reactor, in Example 1.

Example 3

A modified conjugated diene-based polymer was prepared by performing the same method as in Example 1 except for continuously supplying the third monomer solution to the second reactor in a rate of 51.04 g/h, in Example 1.

Example 4

A modified conjugated diene-based polymer was prepared by performing the same method as in Example 1 except for continuously supplying a solution in which 15 wt % of 4-ethyl-N,N-bis(trimethylsilyl)aniline was dissolved in n-hexane as the second monomer solution to the first reactor in a rate of 87.76 g/h, in Example 1.

Comparative Example 1

A modified conjugated diene-based polymer was prepared by performing the same method as in Example 1 except for not supplying the second monomer solution and the third monomer solution to the first reactor, in Example 1.

Comparative Example 2

A modified conjugated diene-based polymer was prepared by performing the same method as in Example 1 except for not supplying the third monomer solution to the second reactor, in Example 1.

Comparative Example 3

A modified conjugated diene-based polymer was prepared by performing the same method as in Example 1 except for not supplying the second monomer solution to the first reactor, in Example 1.

Comparative Example 4

A modified conjugated diene-based polymer was prepared by performing the same method as in Example 2 except for not supplying the second monomer solution to the first reactor, in Example 2.

Experimental Example 1

With respect to each of the modified conjugated diene-based polymers prepared in the Examples and Comparative Examples, the styrene unit content and the 1,2-vinyl content in the polymers, a weight average molecular weight (Mw, $\times 10^3$ g/mol), a number average molecular weight (Mn, $\times 10^3$ g/mol), molecular weight distribution (PDI, MWD), the Si content, the N content and the S content were measured, respectively, and the results are shown in Table 1 below.

1) Styrene Unit (SM) Content (Wt %) and 1,2-Vinyl Content (Wt %)

The styrene unit (SM) and 1,2-vinyl contents in each polymer were measured and analyzed using Varian VNMRS 500 MHz NMR.

When measuring NMR, 1,1,2,2-tetrachloroethane was used as a solvent, and styrene unit and 1,2-vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

2) Weight Average Molecular Weight (Mw, $\times 10^3$ g/Mol), Number Average Molecular Weight (Mn, $\times 10^3$ g/Mol), and Molecular Weight Distribution (PDI, MWD)

By gel permeation chromatography (GPC) analysis, the weight average molecular weight (Mw) and the number average molecular weight (Mn) were measured. In addition, the molecular weight distribution (PDI, MWD, Mw/Mn) was calculated from each molecular weight thus measured. Particularly, the GPC was performed by using two columns of PLgel Olexis (Polymer Laboratories Co.) and one column of PLgel mixed-C (Polymer Laboratories Co.) in combination. For calculating the molecular weight, polystyrene (PS) was used as a GPC standard material. A GPC measurement solvent used a mixture of tetrahydrofuran and 2 wt % of an amine compound.

3) Si Content

The Si content was measured by an ICP analysis method using an inductively coupled plasma optical emission spectroscopy (ICP-OES; Optima 7300DV). Particularly, measurement was performed by adding about 0.7 g of a specimen to a platinum (Pt) crucible and adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:
1) step 1: initial temp 0° C., rate (temp/hr) 180° C./hr, temp (holdtime) 180° C. (1 hr)
2) step 2: initial temp 180° C., rate (temp/hr) 85° C./hr, temp (holdtime) 370° C. (2 hr)
3) step 3: initial temp 370° C., rate (temp/hr) 47° C./hr, temp (holdtime) 510° C. (3 hr),
adding 1 mL of concentrated nitric acid (48 wt %) and 20 μl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 mL of ultrapure water, and performing incineration.

4) N Content

The N content was measured through an NSX analysis method using a quantitative analyzer of a trace amount of nitrogen (NSX-2100H). Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

5) S Content

The measurement was conducted through a combustion ion chromatography (C-IC) analysis method, and the combustion ion chromatography analysis was measured using ICS2100/AQF-2100H. Particularly, the combustion ion chromatography used IonPac AS18(4×250 mm) as a column and a suppressed conductivity detector as a detector, set a supply current to 76 mA, and set a solvent such that 30.05 mM of KOH was injected in a flow rate of 1 ml/min. The combustion temperature was set such that an inlet was 900° C., and an outlet was 1,000° C., and the flow rates of carrier gases were set to 200 ml/min for an Ar gas, and 400 ml/min for a $O_2$ gas. After stabilizing the analyzer, a standard material (ERM-EC680K or ERM-EC681M) was analyzed to make a calibration curve. After that, a boat containing 50 mg of a specimen was burnt and passed through an aqueous solution including an absorbent ($H_2O_2$ 900 mg/kg) to dilute to a final volume of 10 ml, 100 μl of the diluted sample was collected and passed through the analyzer, and the S content coming out was calculated using the calibration curve of the standard material.

TABLE 1

| Division | | Example | | | | Comparative Example | | | |
|---|---|---|---|---|---|---|---|---|---|
| | | 1 | 2 | 3 | 4 | 1 | 2 | 3 | 4 |
| NMR (wt %) | SM | 15 | 15 | 15 | 15 | 15 | 15 | 15 | 15 |
| | Vinyl | 25 | 25 | 25 | 25 | 25 | 25 | 25 | 25 |
| GPC | Mw (×10³ g/mol) | 268 | 304 | 272 | 273 | 263 | 260 | 280 | 290 |
| | Mn (×10³ g/mol) | 176 | 181 | 169 | 172 | 172 | 171 | 176 | 179 |
| | PDI | 1.52 | 1.68 | 1.61 | 1.59 | 1.53 | 1.52 | 1.59 | 1.62 |
| S content (ppm) | | 32 | 67 | 60 | 29 | 0 | 0 | 28 | 59 |
| Si content (ppm) | | 158 | 154 | 147 | 283 | 167 | 155 | 158 | 156 |
| N content (ppm) | | 202 | 214 | 205 | 143 | 79 | 207 | 82 | 80 |

As shown in Table 1, it could be confirmed that the modified conjugated diene-based polymers of Example 1 to Example 4 showed molecular weight distribution of 1.0 or more and less than 3.0, the S content of 25 ppm or more, at the same time, the Si content of 100 ppm or more, and the N content of 200 ppm or more. Meanwhile, in case of Comparative Example 1 and Comparative Example 2, the S content was 0, and Comparative Example 1, Comparative Example 3 and Comparative Example 4 showed markedly reduced numerical values to a half level of the N content in contrast to Example 1 to Example 4. In this case, Comparative Example 1 corresponds to a polymer prepared without using the N-containing aromatic hydrocarbon compound, the S-containing aromatic hydrocarbon compound and the S-containing heterocycle compound suggested in the present invention, Comparative Example 2 corresponds to a polymer prepared without using the S-containing aromatic hydrocarbon compound and the S-containing heterocycle compound during polymerization, and Comparative Example 3 and Comparative Example 4 correspond to polymers prepared without using the N-containing aromatic hydrocarbon compound during polymerization. Through this, it could be found that the modified conjugated diene-based polymer according to the present invention includes a derived unit from the N-containing aromatic hydrocarbon compound, a derived unit from the S-containing aromatic hydrocarbon compound or a derived unit from the S-containing heterocycle compound, and a derived unit from a modifier in a polymer chain, and through Experimental Example 2 described below, the markedly improving effects of tensile strength, rolling resistance and abrasion resistance due to such difference could be confirmed.

Experimental Example 2

In order to comparatively analyze the physical properties of a rubber composition including each of the modified conjugated diene-based copolymers prepared in the Examples and Comparative Examples, and a molded article manufactured therefrom, tensile strength, abrasion resistance and rolling resistance were measured, respectively, and the results are shown in Table 3 below.

1) Preparation of Rubber Specimen

Compounding was performed using each of the modified conjugated diene-based polymers of the Examples and Comparative Examples as a raw material rubber under the compounding conditions shown in Table 2 below. The amounts of raw materials in Table 2 are represented by parts by weight based on 100 parts by weight of the raw material rubber.

TABLE 2

| Division | Raw material | Amount (parts by weight) |
|---|---|---|
| First stage mulling | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |
| Second stage mulling | Sulfur | 1.5 |
| | Rubber accelerator | 1.75 |
| | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. In the second stage mulling, the first compound mixture was cooled to room temperature, and the first compound mixture, sulfur, a rubber accelerator (DPD (diphenylguanine)), and a vulcanization accelerator (CZ (N-cyclohexyl-2-benzothiazylsulfenamide)) were added to the mulling apparatus and mixed at a temperature of 100° C. or less to obtain a second compound mixture. Then, via a curing process at 160° C. for 20 minutes, a rubber specimen was formed. [002 56]

2) Tensile Properties

Based on ASTM 412 tensile test method, each specimen was manufactured, and tensile strength when breaking of the specimen was measured. Particularly, tensile properties were measured using a Universal Test Machin 4204 tensile tester (Instron Co.) in a rate of 50 cm/min at room temperature. In Table 3, the resultant values are shown by index based on the resultant values of Comparative Example 1, and the higher numerical value represents better results.

3) Rolling Resistance

The viscoelasticity properties were confirmed by measuring viscoelasticity behavior on thermodynamic deformation at each measurement temperature (−60° C.-60° C.) with a frequency of 10 Hz by using a dynamic mechanical analyzer (GABO Co.) in a film tension mode, and securing a tan 5 value. From the resultant values, if the tan 5 value at a high temperature of 60° C. decreases, hysteresis loss becomes small, and rolling resistance (fuel consumption ratio) becomes good. However, in Table 3, the resultant values are shown by index based on the resultant values of Comparative Example 1, and the higher numerical value represents better results.

4) Abrasion Resistance (DIN Abrasion Test)

For each rubber specimen, DIN abrasion test was performed based on ASTM D5963, and shown by DIN loss index (loss volume index: ARIA (abrasion resistance index, Method A)). In Table 3, the resultant values are shown by index based on the resultant values of Comparative Example 1, and the higher numerical value represents better results.

TABLE 3

| | Example | | | | Comparative Example | | | |
|---|---|---|---|---|---|---|---|---|
| Division | 1 | 2 | 3 | 4 | 1 | 2 | 3 | 4 |
| Tensile strength (kgf/cm$^2$) | 113 | 113 | 115 | 114 | 100 | 102 | 107 | 107 |
| Rolling resistance (tan δ at 60° C.) | 117 | 119 | 117 | 120 | 100 | 109 | 104 | 106 |
| Abrasion resistance (DIN) | 115 | 118 | 122 | 116 | 100 | 102 | 108 | 107 |

As shown in Table 3, it was confirmed that all of Example 1 to Example 4 showed largely improved effects of tensile strength, rolling resistance and abrasion resistance in contrast to Comparative Example 1 to Comparative Example 4. Particularly, Example 1 to Example 4 showed markedly improved effects of tensile strength, rolling resistance and abrasion resistance in contrast to Comparative Example 1 by 10% or more, and in this case, Comparative Example 1 corresponds to a polymer prepared without using the N-containing aromatic hydrocarbon compound, the S-containing aromatic hydrocarbon compound and the S-containing heterocycle compound suggested in the present invention. In addition, Example 1 to Example 4 showed markedly improved tensile strength, rolling resistance and abrasion resistance even in contrast to Comparative Example 2 to Comparative Example 4 by at least 5% to at most 15% or more, and in this case, Comparative Example 2 to Comparative Example 4 correspond to polymers prepared without using the N-containing aromatic hydrocarbon compound, or the S-containing aromatic hydrocarbon compound and the S-containing heterocycle compound, suggested in the present invention.

Through this, it could be confirmed that the modified conjugated diene-based polymer according to the present invention includes a derived unit from an N-containing aromatic hydrocarbon compound, and a derived unit from an S-containing aromatic hydrocarbon compound or a derived unit from an S-containing heterocycle compound by preparing using an N-containing aromatic hydrocarbon compound, and an S-containing aromatic hydrocarbon compound or an S-containing heterocycle compound during polymerization, and tensile strength, rolling resistance and abrasion resistance are markedly improved in balance.

The invention claimed is:

1. A modified conjugated diene-based polymer comprising:
   a repeating unit from a conjugated diene-based monomer;
   a derived unit from an N-containing aromatic hydrocarbon compound;
   a derived unit from an S-containing aromatic hydrocarbon compound or an S-containing heterocycle compound, and
   Si,
   wherein each of Si content and N content is 50 ppm or more based on the total weight of the polymer, and wherein the modified conjugated diene-based polymer satisfies the following conditions (i) and (ii):
(i) molecular weight distribution (PDI; MWD): 1.0 or more and less than 3.0; and
(ii) a S content is 25 ppm or more based on a total weight of the polymer.

2. The modified conjugated diene-based polymer of claim 1, wherein the N-containing aromatic hydrocarbon compound includes a compound represented by the following Formula 1;

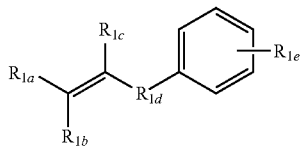

[Formula 1]

in Formula 1,
$R_{1a}$ to $R_{1c}$ are each independently a hydrogen atom; an alkyl group of 1 to 20 carbon atoms;
an alkenyl group of 2 to 20 carbon atoms; an alkynyl group of 2 to 20 carbon atoms; a heteroalkyl group of 1 to 20 carbon atoms, a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; or a heterocyclic group of 3 to 20 carbon atoms,
$R_{1d}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, and
$R_{1e}$ is a substituent represented by the following Formula 1a:

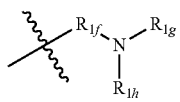

[Formula 1a]

in Formula 1a,
$R_{1f}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, where the substituent is an alkyl group of 1 to 10 carbon atoms, a cycloalkyl group of 5 to 10 carbon atoms, or an aryl group of 6 to 20 carbon atoms, and
$R_{1g}$ and $R_{1h}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a monosubstituted, disubstituted or trisubstituted alkyl silyl group substituted with an alkyl group of 1 to 10 carbon atoms, or $R_{1g}$ and $R_{1h}$ are connected with each other to form together with N, a substituted with an alkyl group of 1 to 10 carbon atoms or unsubstituted heterocyclic group of 2 to 10 carbon atoms.

3. The modified conjugated diene-based polymer of claim 2, wherein, in Formula 1,
$R_{1a}$ to $R_{1c}$ is each independently a hydrogen atom; an alkyl group of 1 to 10 carbon atoms; an alkenyl group of 2 to 10 carbon atoms; an alkynyl group of 2 to 10 carbon atoms; a heteroalkyl group of 1 to 10 carbon atoms, a heteroalkenyl group of 2 to 10 carbon atoms; a heteroalkynyl group of 2 to 10 carbon atoms; a cycloalkyl group of 5 to 10 carbon atoms; an aryl group of 6 to 10 carbon atoms; or a heterocyclic group of 3 to 10 carbon atoms,
$R_{1d}$ is a single bond, or an unsubstituted alkylene group of 1 to 10 carbon atoms,
$R_{1e}$ is a substituent represented by Formula 1a, and
in Formula 1a,
$R_{1f}$ is a single bond, or an unsubstituted alkylene group of 1 to 10 carbon atoms, and
$R_{1g}$ and $R_{1h}$ are each independently an alkyl group of 1 to 10 carbon atoms; an alkenyl group of 2 to 10 carbon atoms; an alkynyl group of 2 to 10 carbon atoms; a heteroalkyl group of 1 to 10 carbon atoms; a heteroalkenyl group of 2 to 10 carbon atoms; a heteroalkynyl group of 2 to 10 carbon atoms; a cycloalkyl group of 5 to 10 carbon atoms; an aryl group of 6 to 10 carbon atoms; a heterocyclic group of 3 to 10 carbon atoms; or a monosubstituted, disubstituted or trisubstituted alkylsilyl group substituted with an alkyl group of 1 to 6 carbon atoms, or $R_{1g}$ and $R_{1h}$ may be connected with each other to form together with N, a substituted with an alkyl group of 1 to 6 carbon atoms or unsubstituted heterocyclic group of 2 to 10 carbon atoms.

4. The modified conjugated diene-based polymer of claim 2, wherein
$R_{1a}$ to $R_{1c}$ is each independently a hydrogen atom or an alkyl group of 1 to 6 carbon atoms,
$R_{1d}$ is a single bond or an unsubstituted alkylene group of 1 to 6 carbon atoms, and
$R_{1e}$ is a substituent represented by Formula 1a.

5. The modified conjugated diene-based polymer of claim 1, wherein the S-containing aromatic hydrocarbon compound includes a compound represented by the following Formula 2:

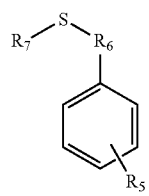

[Formula 2]

in Formula 2,
$R_5$ is a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 5 to 30 carbon atoms; or a heterocyclic group of 3 to 30 carbon atoms, $R_6$ is a single bond; or an alkylene group of 1 to 20 carbon atoms, and $R_7$ is an alkenyl group of 2 to 30 carbon atoms.

6. The modified conjugated diene-based polymer of claim 5, wherein, in Formula 2, $R_5$ is a hydrogen atom; an alkyl group of 1 to 10 carbon atoms; or a heteroalkyl group of 1 to 10 carbon atoms, $R_6$ is a single bond; or an alkylene group of 1 to 10 carbon atoms, and $R_7$ is an alkenyl group of 2 to 10 carbon atoms.

7. The modified conjugated diene-based polymer of claim 1, wherein the S-containing heterocyclic compound includes a compound represented by the following Formula 3:

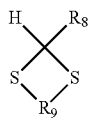

[Formula 3]

in Formula 3, $R_8$ is a hydrogen atom, a substituted with a substituent X or unsubstituted alkyl group of 1 to 20 carbon atoms, a substituted with a substituent X or unsubstituted cycloalkyl group of 1 to 20 carbon atoms or a substituted with a substituent X or unsubstituted aryl group of 6 to 30 carbon atoms, $R_9$ is a substituted with a substituent X or unsubstituted alkylene group of 1 to 5 carbon atoms, and the substituent X is selected from the group consisting of a hydroxyl group (—OH), a halogen group, a primary amino group (—NH$_2$), and a secondary amino group (—NHR'), in a case where X is the secondary amino group, R' is an alkyl group of 1 to 10 carbon atoms.

8. The modified conjugated diene-based polymer of claim 7, wherein, in Formula 3, $R_8$ is an unsubstituted alkyl group of 1 to 10 carbon atoms, an unsubstituted cycloalkyl group of 1 to 10 carbon atoms or an unsubstituted aryl group of 6 to 12 carbon atoms, and $R_9$ is an unsubstituted alkylene group of 1 to 3 carbon atoms.

9. The modified conjugated diene-based polymer of claim 1, further comprising a functional group derived from an aminoalkoxysilane-based modifier.

10. The modified conjugated diene-based polymer of claim 9, wherein the aminoalkoxysilane-based modifier includes a compound represented by the following Formula 4:

$$(R_{24}-R_{23})_b-N-(R_{20}-Si(OR_{21})_a(R_{22})_{3-a})_c$$ [Formula 4]

in Formula 4, $R_{20}$ is a single bond, or an alkylene group of 1 to 10 carbon atoms, $R_{21}$ and $R_{22}$ are each independently an alkyl group of 1 to 10 carbon atoms, $R_{23}$ is a single bond or an alkylene group of 1 to 10 carbon atoms, $R_{24}$ is hydrogen, an alkyl group of 1 to 10 carbon atoms, or an alkylsilyl group disubstituted, trisubstituted or tetrasubstituted with alkyl groups of 1 to 10 carbon atoms, a is an integer of 2 or 3, c is an integer of 1 to 3, and b is an integer of 0 to 2, where b+c=3.

11. A method for preparing the modified conjugated diene-based polymer of claim 1, the method comprising:

polymerizing a first monomer and a second monomer in a presence of a polymerization initiator in a hydrocarbon solvent to prepare a first active polymer;

polymerizing the first active polymer and a third monomer; and adding an aminoalkoxysilane-based modifier and performing modification reaction, wherein the first monomer includes the conjugated diene-based monomer, or the conjugated diene-based monomer and an aromatic vinyl-based monomer, the second monomer includes the N-containing aromatic hydrocarbon compound, and the third monomer includes the S-containing aromatic hydrocarbon compound or the S-containing heterocyclic compound.

12. The method for preparing the modified conjugated diene-based polymer of claim 11, wherein each of the second monomer and the third monomer is used in 0.01 g to 10 g based on 100 g of the first monomer.

13. The method for preparing the modified conjugated diene-based polymer of claim 11, wherein the polymerization initiator is used in 0.01 mmol to 10 mmol based on total 100 g of the first monomer, the second monomer and the third monomer.

14. The method for preparing the modified conjugated diene-based polymer of claim 11, wherein the modifier is used in 0.1 mol to 10 mol based on 1 mol of the polymerization initiator.

15. A rubber composition comprising the modified conjugated diene-based polymer of claim 1 and a filler.

16. The rubber composition of claim 15, wherein the rubber composition comprises 0.1 parts by weight to 200 parts by weight of the filler based on 100 parts by weight of the modified conjugated diene-based polymer.

17. The rubber composition of claim 15, wherein the filler is a silica-based filler or a carbon black-based filler.

* * * * *